United States Patent
Kaneko et al.

(10) Patent No.: US 10,622,027 B1
(45) Date of Patent: Apr. 14, 2020

(54) MAGNETIC STORAGE DEVICE WITH IMPROVED TOP COVER GASKET AND ASSOCIATED METHOD OF MANUFACTURE

(71) Applicant: Western Digital Technologies, Inc., Irvine, CA (US)

(72) Inventors: Jiro Kaneko, Kanagawa (JP); Yoshiya Usami, Tokyo (JP); Yuichi Arai, Kanagawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/203,406

(22) Filed: Nov. 28, 2018

(51) Int. Cl.
*G11B 33/14* (2006.01)
*G11B 25/04* (2006.01)

(52) U.S. Cl.
CPC ........ *G11B 33/1466* (2013.01); *G11B 25/043* (2013.01); *G11B 33/14* (2013.01); *G11B 33/1446* (2013.01)

(58) Field of Classification Search
None
See application file for complete search history.

(56) References Cited

U.S. PATENT DOCUMENTS

| | | | | |
|---|---|---|---|---|
| 3,913,927 A | * | 10/1975 | Gordon | F16J 15/106 277/591 |
| 4,896,231 A | * | 1/1990 | Hoppe | G11B 25/043 360/99.15 |
| 4,950,521 A | * | 8/1990 | Takamura | F16J 15/061 277/316 |
| 5,150,267 A | * | 9/1992 | Reinisch | G11B 25/043 360/99.19 |
| 5,282,101 A | * | 1/1994 | Reinisch | G11B 25/043 360/99.19 |
| 5,568,341 A | * | 10/1996 | Shikano | G11B 25/043 360/99.18 |
| 5,793,566 A | * | 8/1998 | Scura | G11B 33/1466 360/99.18 |
| 5,808,830 A | * | 9/1998 | Stefansky | G11B 5/5526 360/137 |

(Continued)

FOREIGN PATENT DOCUMENTS

| | | |
|---|---|---|
| EP | 3134898 | 3/2017 |
| JP | 2004323833 A * | 11/2004 |

(Continued)

*Primary Examiner* — William J Klimowicz
(74) *Attorney, Agent, or Firm* — Kunzler Bean & Adamson

(57) ABSTRACT

Disclosed herein is a magnetic storage device that comprises a housing having a base and a cover. The base includes a bottom portion and side portions that define an interior cavity for maintaining magnetic disks. The side portions form a top surface configured to receive the cover. The magnetic storage device also includes a continuous gasket disposed between the cover and the top surface. The continuous gasket is formed with at least a first region having a first cross-sectional profile, and a second region having a second cross-sectional profile. The magnetic storage device also includes an adhesive disposed between the continuous gasket and the top surface and configured to bond the continuous gasket to the base.

10 Claims, 7 Drawing Sheets

(56) References Cited

U.S. PATENT DOCUMENTS

| | | | |
|---|---|---|---|
| 6,619,667 B2 * | 9/2003 | Kawaguchi | F16J 15/022 277/628 |
| 6,623,684 B1 * | 9/2003 | Satoh | B29C 45/0025 264/259 |
| 7,389,992 B2 * | 6/2008 | Isono | F16J 15/025 277/637 |
| 7,654,538 B2 * | 2/2010 | Oka | F16J 15/022 277/644 |
| 7,852,601 B1 | 12/2010 | Little | |
| 7,959,161 B2 * | 6/2011 | Seki | F16J 15/061 277/630 |
| 8,400,730 B2 * | 3/2013 | Uranaka | C09K 3/1021 277/654 |
| 8,896,964 B1 | 11/2014 | Koji et al. | |
| 9,334,962 B2 * | 5/2016 | Hayashi | F16J 15/106 |
| 9,508,393 B1 * | 11/2016 | Le | G11B 33/1466 |
| 9,721,619 B2 | 8/2017 | Sudo et al. | |
| 9,818,454 B1 | 11/2017 | Albrecht et al. | |
| 9,852,777 B2 | 12/2017 | Albrecht | |
| 10,134,448 B2 * | 11/2018 | Albrecht | G11B 33/1466 |
| 2002/0030923 A1 * | 3/2002 | Satoh | G11B 25/043 360/99.22 |
| 2003/0133222 A1 * | 7/2003 | Ong | G11B 33/121 360/99.21 |
| 2004/0012879 A1 * | 1/2004 | Yagenji | G11B 33/1466 360/99.22 |
| 2004/0056429 A1 * | 3/2004 | Okazaki | F16J 15/061 277/627 |
| 2004/0075224 A1 * | 4/2004 | Kuroki | F16J 15/0818 277/650 |
| 2005/0206093 A1 * | 9/2005 | Utsunomiya | F16J 15/108 277/628 |
| 2006/0049585 A1 * | 3/2006 | Isono | F16J 15/025 277/637 |
| 2006/0074170 A1 * | 4/2006 | Kojima | C08L 23/02 524/474 |
| 2008/0150240 A1 * | 6/2008 | Isono | F16J 15/025 277/650 |
| 2010/0232059 A1 * | 9/2010 | Choi | G11B 33/1466 360/97.12 |
| 2011/0038076 A1 * | 2/2011 | Hayakawa | G11B 25/043 360/97.16 |

FOREIGN PATENT DOCUMENTS

| | | | |
|---|---|---|---|
| JP | 2007328880 A | * 12/2007 | |
| WO | WO-2017163885 A1 | * 9/2017 | C09K 3/10 |

* cited by examiner

MAGNETIC STORAGE DEVICE WITH IMPROVED TOP COVER GASKET AND ASSOCIATED METHOD OF MANUFACTURE

FIELD

This disclosure relates generally to magnetic storage devices, and more particularly to improving the storage capacity of magnetic storage devices.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include one or more magnetic disks and read-write heads, within a housing, that help facilitate storage of data on the magnetic disks. The form factor of HDD housings has over time, for the most part, become standardized at about 2.5 or 3.5 inches. HDD manufacturers continually strive to increase the storage capacity of HDDs. One method of doing so is to increase the size (i.e., diameter) and/or quantity of magnetic disks in the HDD housing. Merely increasing the diameter of each magnetic disk by 1 mm can significantly increase the storage capacity of the HDD. However, maintaining the integrity of the environment within the HDD housing can be difficult when increasing the diameter of each magnetic disk.

SUMMARY

A need exists for a magnetic storage device and a method of manufacture that increases the storage capacity of a magnetic storage device while maintaining the environment within a housing. The subject matter of the present application has been developed in response to the present state of magnetic storage devices, and in particular, in response to problems and needs in the art, such as those discussed above, that have not yet been fully solved by currently available magnetic storage devices. Accordingly, the embodiments of the present disclosure overcome at least some of the shortcomings of the prior art.

Disclosed herein is a magnetic storage device that comprises a housing having a base and a cover, where the base includes a bottom portion and side portions defining an interior cavity for maintaining magnetic disks. In certain embodiments, the side portions form a top surface configured to receive the cover. The magnetic storage device may also include a continuous gasket disposed between the cover and the top surface a base. The gasket, in some embodiments, includes a first region having a first cross-sectional profile having a width and a height, and a second region having a second cross-sectional profile having a width and a height, where the width of the first region is greater than the width of the second region.

In some embodiments, the width of the first cross-sectional profile is greater than or equal to the height of the first cross-sectional profile. Additionally or alternatively, the width of the second cross-sectional is less than the height of the second cross-sectional profile.

In certain embodiments, the base includes a rib extending outward from the top surface that is configured to position the cover with respect to the base. The rib forms a perimeter around the cover and includes a first inner sidewall that is offset from a second inner sidewall formed by the side portions. The top surface is disposed between the first inner sidewall and the second inner sidewall. The second cross-sectional profile of the gasket may include a first side configured to engage the top surface and a second side configured to engage the first inner sidewall.

In some embodiments, the gasket includes a quantity of three regions having the second cross-sectional profile, each of the three regions being positioned adjacent one of three locations where an outside diameter of the plurality of magnetic disks comes nearest the side portions, and where each of the three regions is substantially linear. In some embodiments, the adhesive is disposed in a corner formed by an intersection of the top surface and the first inner sidewall in areas that correspond to the three regions of the gasket. Alternatively, the adhesive is disposed between the first region and the top surface and is not disposed between any of the second regions and the top surface. In alternative embodiments, the gasket is a formed-in-place gasket requiring no additional adhesive.

Also disclosed herein is a method of making a magnetic storage device. The method includes providing a continuous gasket comprising a first region having a first cross-sectional profile and a second region having a second cross-sectional profile, securing the continuous gasket to a top surface of a base, and securing a cover to the base to hermetically seal a cavity defined by a bottom portion and side portions of the base.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
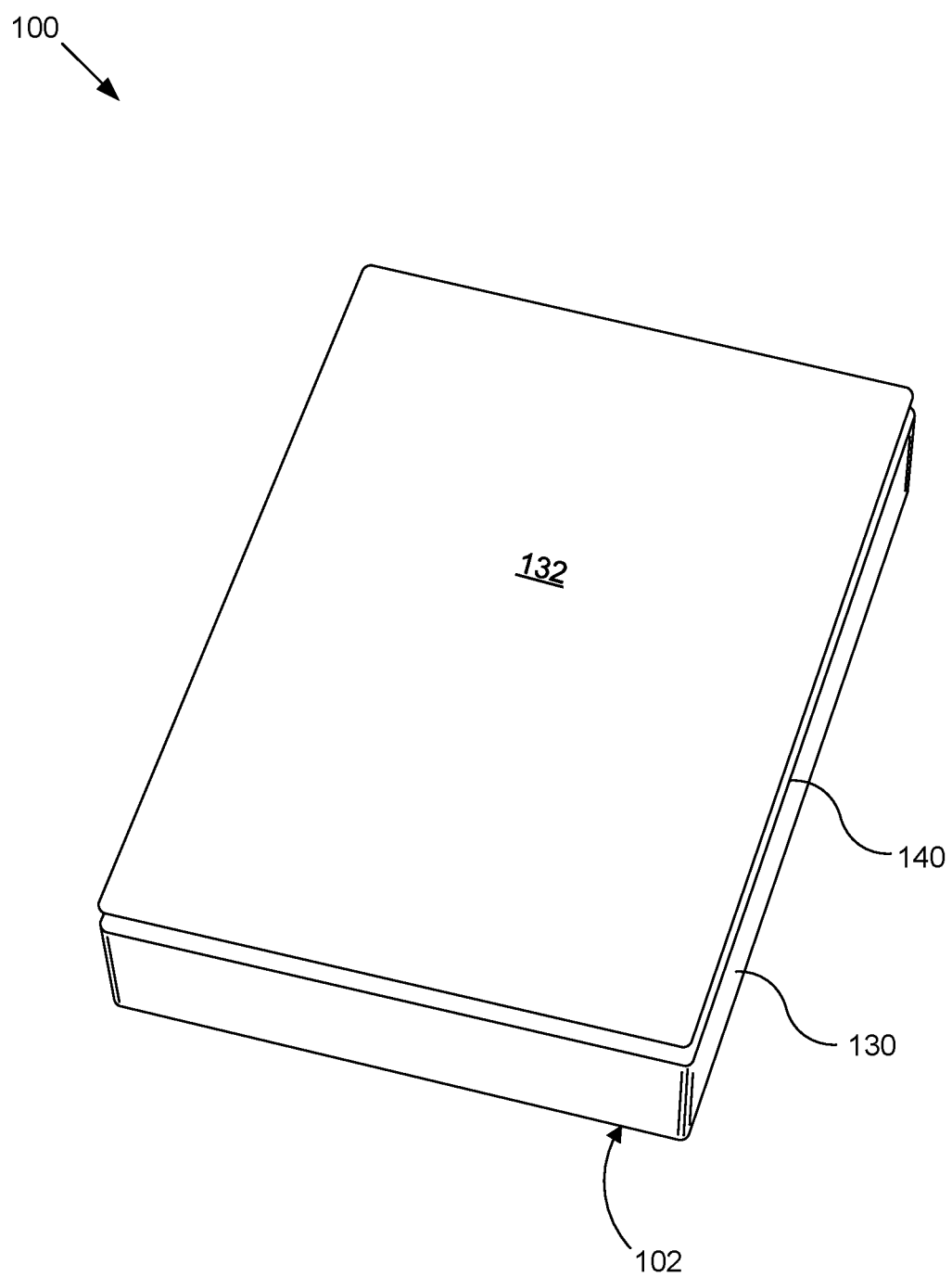
FIG. 1 is a perspective view of a magnetic storage device in accordance with embodiments of the present disclosure.

Turning now to the figures, FIG. 1 is a perspective view of a magnetic storage device in accordance with embodiments of the present disclosure. The magnetic storage device 100 (e.g., magnetic recording device), according to certain embodiments, is depicted as a hard disk drive (HDD). However, in other embodiments, the magnetic storage device 100 can be any of various magnetic storage devices without departing from the essence of the subject matter of the present disclosure. The magnetic storage device 100 includes a housing 102 that seals or encloses an interior cavity 202 defined within the housing (see, e.g., FIG. 2). The housing 102 includes a base 130 and a cover 132. The cover 132 is coupled to the base 130 to enclose the interior cavity 202 (see FIG. 2) from the environment exterior to the housing 102. In some implementations, a seal or gasket is positioned between the base 130 and the cover 132 to promote a hermetic seal between the base 130 and the cover 132. In some examples, the seal between the base 130 and the cover 132 is sufficiently strong to retain, over time, the environmental conditions within the interior cavity 202 at the time the housing 102 is sealed.

Figure 2:
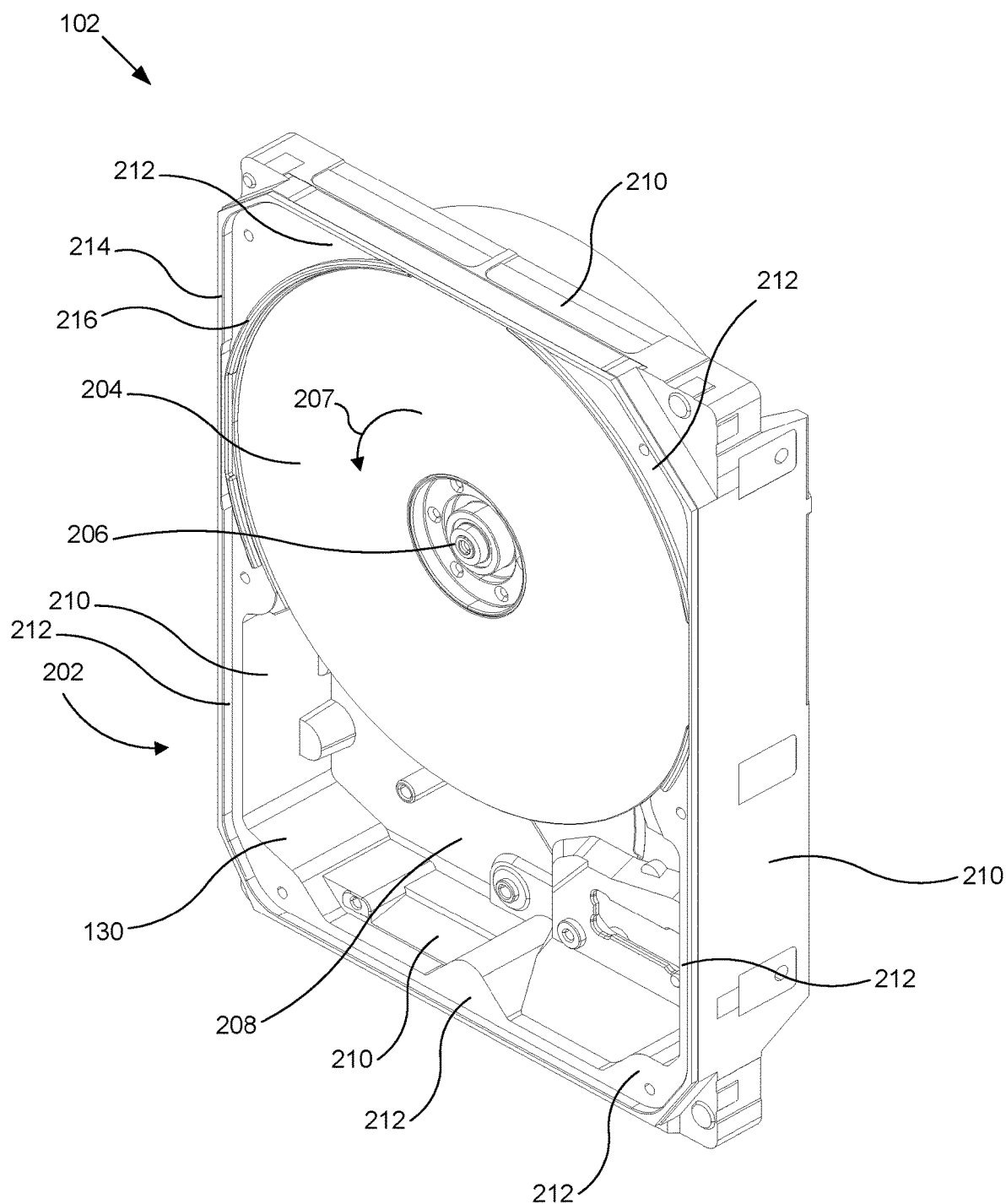
FIG. 2 is a perspective view of another embodiment of the magnetic storage device in accordance with embodiments of the present disclosure.

FIG. 2 is a perspective view of another embodiment of the magnetic storage device in accordance with embodiments of the present disclosure. The magnetic storage device 100, depicted here without the cover 132, includes various components located within the interior cavity 202 of the housing 102. In the depicted embodiment, the magnetic storage device 100 is configured to maintain, within the cavity 202, one or more magnetic disks 204 disposed on a spindle, and a spindle motor 206. The spindle motor 206 is coupled to the base 130 at a bottom portion 208. Generally, the spindle motor 206 includes a stationary portion non-movably fixed relative to the base 130 and the spindle that is rotatable relative to the stationary portion and the base 130.

Accordingly, the spindle of the spindle motor 206 can be considered to be part of or integral with the spindle motor 206. Generally, the spindle motor 206 is operable to rotate the spindle relative to the base 130. The disks 204, or platters, are co-rotatably fixed to the spindle of the spindle motor 206 via respective hubs, which are co-rotatably secured to respective disks 204 and the spindle. As the spindle of the spindle motor 206 rotates, the disks 204 correspondingly rotate. In this manner, the spindle of the spindle motor 206 defines a rotational axis of each disk 204. The spindle motor 206 can be operatively controlled to rotate the disks 204, in a rotational direction 207, a controlled amount at a controlled rate.

Each of the disks 204 may be any of various types of magnetic storage media. Generally, in one embodiment, each disk 204 includes a substrate and a magnetic material applied directly or indirectly onto the substrate. For example, the magnetic material of the disks 204 may be conventional granular magnetic storage disks or wafers that have magnetic layer bits with multiple magnetic grains on each bit. In granular magnetic media, all of the bits are co-planar and the surface 204 of the disk is substantially smooth and continuous. In one embodiment, each bit has a magnetic dipole moment that can either have an in-plane (longitudinal) orientation or an out-of-plane (perpendicular) orientation. For clarity, many of the other components have been omitted, including for example, a carriage that supports read/write heads, and a voice coil motor (VCM).

In certain embodiments, the base 130, together with the cover 132, forms the housing 102. The base 130 may include the bottom portion 208 and side portions 210 coupled to and extending from the bottom portion 208. Together, the bottom portion 208 and the vertical side walls or portions 210 form the cavity 202. The side portions 210 each include a top surface 212 that forms a substantially planar surface ("sealing surface") for receiving the cover 132.

The top surface 212 of each of the side portions 210 may be continuous with the top surface 212 of an adjacent side portion 210. In other words, the top surfaces 212 of the sides may form a continuous shelf, that varies in thickness, to which the cover 132 may be secured. The side portions 210 may vary in thickness to accommodate the different components of the magnetic storage device 100. In particular, the thickness of the side portions 210 may be minimal in the regions nearest the outside diameter ("OD") of the disks 204, especially where the side portions 210 pass by the OD of the disks 204. The side portions 210, for example, may have a thickness in the range of between about 1 and 3 mm nearest the OD of the disks 204, and the corresponding top surface 212 in those regions may have a thickness of about 0.4 mm. A rib 214 may extend above the top surface 212 a distance of between about 1.0 mm and 2.0 mm.

In some embodiments, the rib 214 extends substantially perpendicularly from the top surface 212 of the side portions 210. When the cover 132 is secured to the top surface 212 of the base 130, the rib 214 forms a perimeter around the cover 132. Stated differently, the rib 214 forms a seat or guide that locates and properly positions the cover 132 with respect to the base 130. In other words, the rib 214 forms a boundary around the cover 132. Additionally, the rib 214 forms a top surface to which another cover may be secured, for example, by welding the other cover (see FIGS. 6 and 7).

A gasket 216, a portion of which is shown in FIG. 2, may be disposed between the base 130 and the cover 132 to hermetically seal the magnetic storage device 100 and maintain a gas-enriched atmosphere within the interior cavity 202. As used herein, the term "hermetic" refers to a sealing configuration that has substantially no gas leakage or permeation. Although described as "hermetically sealed," the magnetic storage device 100 may have a negligible leak rate. In one implementation, the gas can include an inert gas with a density lower than air. For example, the gas can include helium. In some examples, the gas consists of helium and oxygen. In other words, in some examples, the entirety of the gas in the interior cavity 202 includes only helium and oxygen, or alternatively, the gas may include trace amounts (such as a percent composition of less than 0.1%) of other gaseous substances. In certain examples, as used herein, helium can be replaced with nitrogen or another inert gas.

Figure 3:
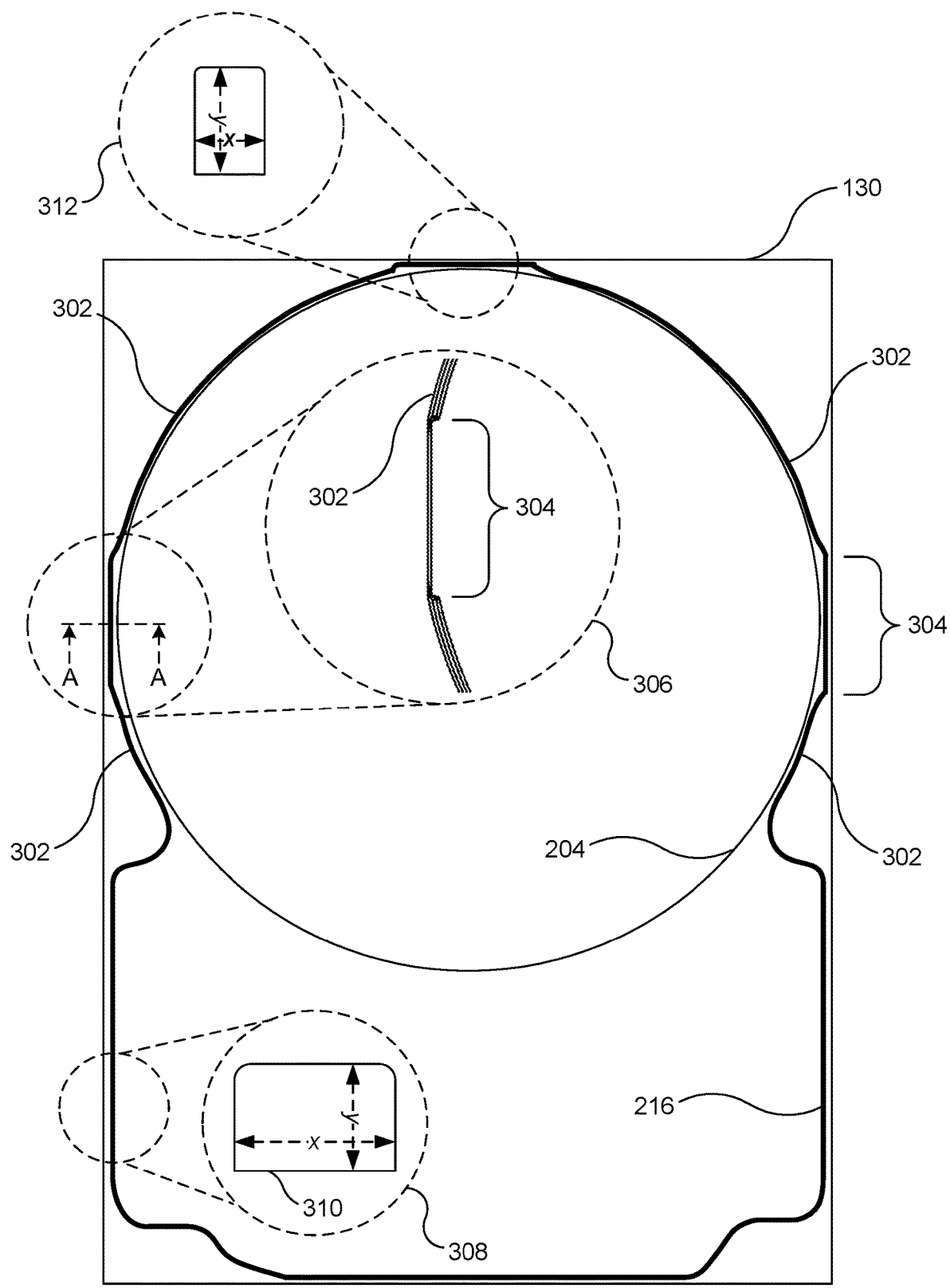
FIG. 3 is a schematic diagram illustrating one embodiment of the gasket in accordance with embodiments of the present disclosure.

FIG. 3 is a schematic diagram illustrating one embodiment of the gasket 216 in accordance with embodiments of the present disclosure. The gasket 216 may be continuous and shaped according to the sealing top surface 212. The top surface 212 may have any shape, but generally borders the cavity 202 formed by the base 130. The top surface 212 may have a varying width (defined as the distance from the cavity to an exterior surface of the side portion). The gasket 216 is configured to engage the top surface 212 and is formed with a shape that contours around the cavity 202.

The gasket 216 may be formed with a thick region 302 having a first cross-sectional shape and at least a thin region 304 having a second cross-sectional shape. As will be presented below in greater detail, the first cross-sectional shape may be substantially circular, or substantially square, or any shape capable of maintaining a hermetic seal while engaging only the cover 132 and the top surface 212. In other words, the areas of the gasket 216 outside of the thin regions 304 are configured to engage two surfaces (e.g., the cover 132 and the top surface 212) and the areas of the gasket 216 inside of the thin regions 304 are configured to engage three surfaces (e.g., the cover 132, the top surface 212, and the inner sidewall of the rib 214, see FIG. 4). Detail view 308 depicts one example of a cross-sectional view of the thick region 302 of the gasket 216. As stated, the cross-sectional profile of the gasket 216 in the thick region may be substantially circular, or alternatively substantially square. In other embodiments, the cross-sectional profile of the thick region 302 may be substantially rectangular (with or without rounded corners), and/or bilaterally symmetric. Additionally or alternatively, the cross-sectional profile may have a width x (measured across a surface 310 that engages the top surface 212) that is greater than or equal to a height y.

Detail view 312 illustrates one example of the second cross-sectional shape (i.e., the cross-sectional shape of the thin region 304). The thin region 304, in certain embodiments, may be positioned adjacent the OD of the disk 204 nearest the side portions of the base 130. The second cross-sectional shape may have a width x that is less than a height y, and a profile having a shape configured to engage surfaces of the magnetic storage device 100 on three sides. In the depicted embodiment, the thin region 304 may be positioned at any of the 12, 3, or 9 o'clock positions. In further embodiments, each of the 12, 3, or 9 o'clock positions is provided with a thin region 304. In certain embodiments, the width x of the gasket 216 in the thin region 304 is substantially equal to the width of the top surface 212 in the areas nearest the OD of the disk 204. As such, the gasket 216, in those areas, is supported by two surfaces of the base 130 (the top surface 212 and a vertical sidewall of the rib 214) and one surface of the cover 132 (see FIG. 4). Although the cross-sectional profile is depicted here as being bilaterally symmetric, other forms of symmetry, or non-symmetry of the cross-sectional profile in the thick region 302 or the thin region 304 are contemplated.

In some embodiments, the gasket 216 is formed of a gas-impermeable polymer, examples of which include, but are not limited to, silicone, or other polymer blends. The gasket 216 may be a formed-in-place gasket made of an anaerobic adhesive (e.g., polyacrylate, UV-cured silicone, 2-part silicone, etc.) or a room-temperature-vulcanizing silicone. A detail view 306 illustrates a top view of a transition between the thick region 302 and the thin region 304 of the gasket 216. As described above, the thin region 304 is disposed between the disk 204 and a side portion 210 where the OD of the disk 204 is nearest to the side portion 210. This narrowing of the gasket 216 allow for an increase in the OD of the disk to, for example, 98 mm. This may be due to the extreme narrowing of the top surface 212 in those areas. Accordingly, a width of the gasket 216 also narrows as the gasket 216 transitions from the thick region 302 to the thin region 304.

Figure 4:
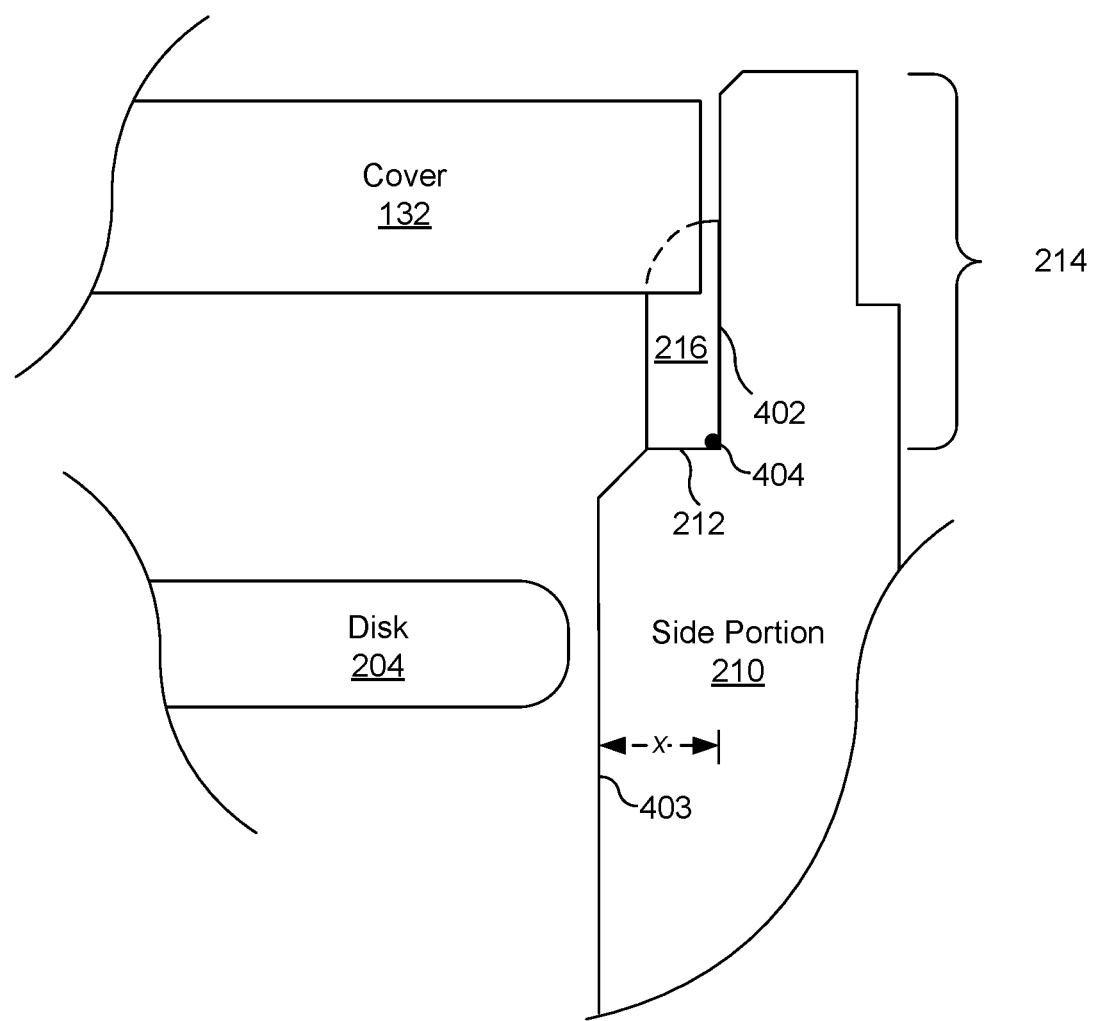
FIG. 4 is a schematic block diagram illustrating a partial cross-sectional view of the magnetic storage device in accordance with embodiments of the present disclosure.

FIG. 4 is a schematic block diagram illustrating a partial cross-sectional view of the disk, gasket, cover, and side portion, taken along line A-A (see FIG. 3), in accordance with embodiments of the present disclosure. The increased OD of the disk 204, as described above, results in areas of the side walls or portions 210 that are thinner. Consequently, the top surface 212 of the side portion is narrowed, as is the gasket 216. The gasket 216, at those areas where the OD of the disk 204 is nearest to the side portion 210, may have a semi-rectangular cross-sectional profile as depicted. In other embodiments, the gasket 216 has a cross-sectional profile having sides that are configured to engage the top surface 212 of the side portion, an inner sidewall 402 of the rib 214, and the cover 132.

In some embodiments, the inner sidewall 402 of the rib extends upward from the top surface 212, offset a distance from an inner wall 403 of the side portion selected to allow the gasket 216 to seat and form a hermetic seal between the cover 132 and the side portion 210. In other words, the inner sidewall 402 is offset from the inner wall 403 a distance x that is sufficient to allow the gasket 216 to properly form a hermetic seal. This distance may vary depending on the proximity of the disk 204 OD. Beneficially, the vertical inner sidewall 402, together with the horizontal top surface 212, support the gasket 216 and prevent the gasket 216 from buckling under pressure of the cover 132.

In certain embodiments, the gasket 216 may be adhered to the top surface 212 with an adhesive 404. The adhesive 404 may be a bead of adhesive positioned in a corner of an intersection, as depicted, between the vertical inner sidewall 402 and the top surface 212. Alternatively, the adhesive 404 may be a thin layer that coats one or both of the top surface 212 and a portion of the vertical inner sidewall 402. In areas of the top surface 212 that are not as narrow, and where the gasket 216 is not positioned adjacent the rib 214, the adhesive 404 is disposed only on the top surface 212 where the gasket 216 will be positioned. In other examples, the adhesive is only applied to regions of the top surface that correspond to the thick region 302 and is not applied to regions of the top surface that correspond to the thin region 304. In alternative embodiments, the gasket 216 is a formed-in-place gasket ("FIPG") that is disposed as a viscous liquid on the top surface 212 and then cured, by UV light for example, and does not require an additionally adhesive, as the FIPG gasket adheres itself to the top surface 212.

Figure 5:
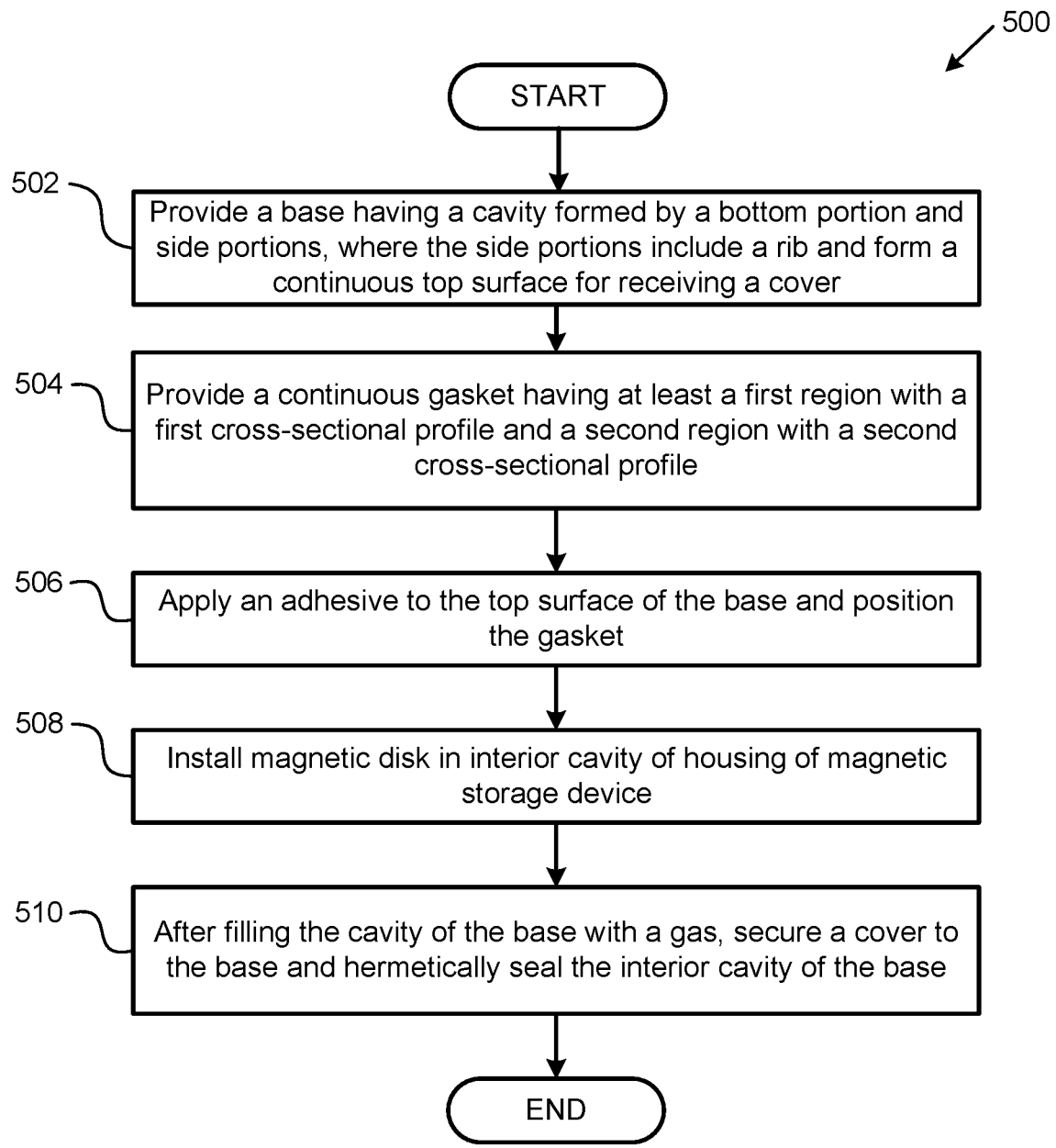
FIG. 5 is a schematic flowchart diagram illustrating one embodiment of a method of manufacturing a magnetic storage device in accordance with embodiments of the present disclosure.

FIG. 5 is a schematic flowchart diagram illustrating one embodiment of a method of manufacturing a magnetic storage device 100 in accordance with embodiments of the present disclosure. According to one example, a method 500 of making the magnetic storage device 100 includes providing 502 the base 130 having the cavity 202 formed by the bottom portion 208 and side portions 210, where the side portions include the rib 214 and the continuous top surface 212 for receiving the cover 132. The rib 214, in one embodiment, extends outward (i.e., away from the bottom portion 208) from the top surface 212. At block 504, the method 500 includes providing the continuous gasket 216 having at least a thick region 302 with a first cross-sectional profile and a thin region 304 with a second cross-sectional profile. The gasket 216 may be provided with a curvilinear thick region 302 and a substantially linear thin region 304. Additionally, the gasket may be provided with multiple thin regions 304 that correspond to the three areas (i.e., 12, 3 and 9 o'clock positions) where the OD of the disk 204 comes nearest to the side portions 210 of the base 130.

At block 506, the method includes applying an adhesive to the top surface 212 of the base 130 and positioning the gasket 216 on the top surface 212. In alternative embodiments, the method includes forming a gasket by dispersing a viscous liquid on the top surface and then curing the viscous liquid by, for example, UV light, to form an FIPG. At block 508, the method includes installing one or more magnetic disks 204 in the interior cavity 202 of the base 130. At block 510, the method includes hermetically sealing the interior cavity of the base by securing the cover 132 to the base 130 and filling the cavity with an inert gas (e.g., helium), for example, through a hole in the housing. In some implementations, the method includes installing the components described above with reference to FIG. 2 before securing the cover 132 to the base 130.

Figure 6:
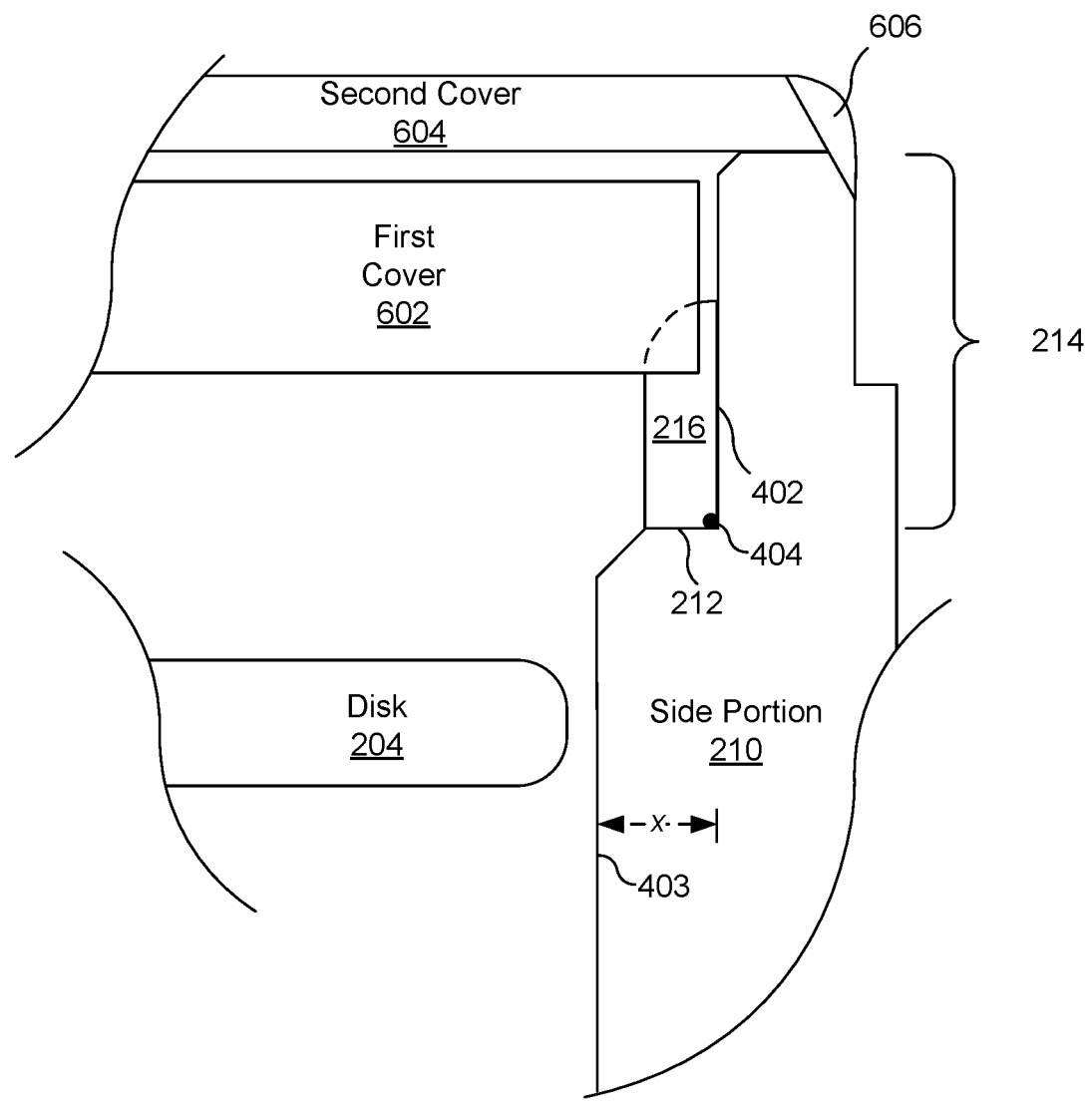
FIG. 6 is a schematic block diagram illustrating another partial cross-sectional view of the magnetic storage device in accordance with embodiments of the present disclosure.

FIG. 6 is a schematic block diagram illustrating another partial cross-sectional view of the disk, gasket, cover, and side portion, taken along line A-A (see FIG. 3), in accordance with embodiments of the present disclosure. In the depicted embodiment, the top cover is formed as a first cover 602 that engages the gasket 216 and seals the cavity of the base 130. A second cover 604 may be welded (illustrated by weld bead 606) to the rib 214. In this embodiment, the rib 214 is known as a "weld rib" because the second cover is welded to the rib 214. A welded second cover 604 beneficially seals off the environment inside the housing 102 from the environment outside the housing 102. As such, a gas (e.g., helium) remains inside the housing 102.

Figure 7:
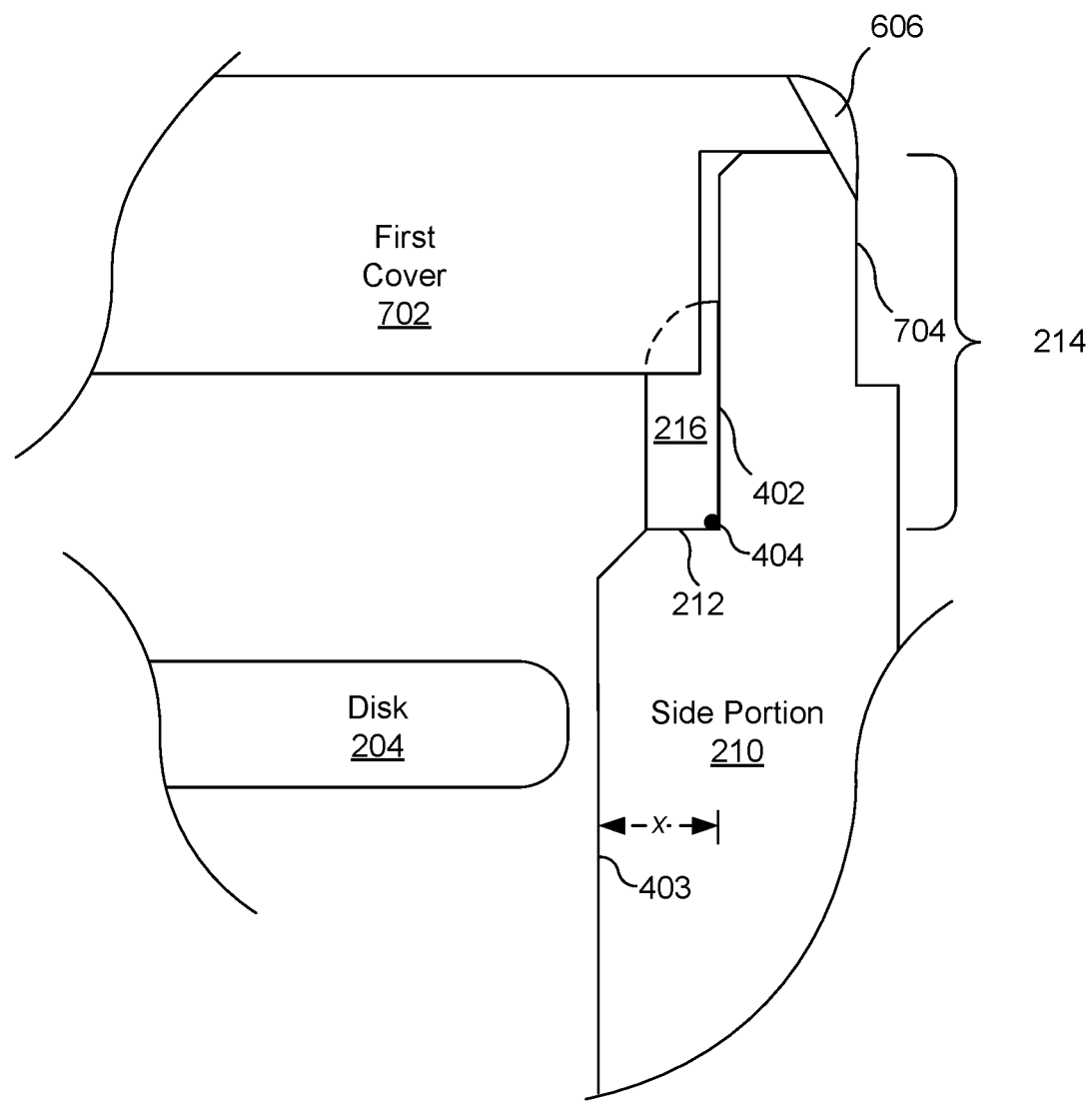
FIG. 7 is a schematic block diagram illustrating yet another partial cross-sectional view of the magnetic storage device in accordance with embodiments of the present disclosure.

FIG. 7 is a schematic block diagram illustrating another partial cross-sectional view of the disk, gasket, cover, and side portion, taken along line A-A (see FIG. 3), in accordance with embodiments of the present disclosure. In the depicted embodiment, the top cover is configured to both engage the gasket 216 and be welded, with a weld bead 606, to the rib 214. As depicted, the cover may be formed with a step that extends outward over a top surface of the rib 214 towards an outer wall 704 of the rib 214. The welded cover 702 beneficially seals off the environment inside the housing 102 from the environment outside the housing 102. As such, a gas (e.g., helium) remains inside the housing 102.

The increased OD of the disk 204, as described above, results in areas of the side walls or portions 210 that are thinner. Consequently, the top surface 212 of the side portion is narrowed, as is the gasket 216. The gasket 216, at those areas where the OD of the disk 204 is nearest to the side portion 210, may have a semi-rectangular cross-sectional profile as depicted. In other embodiments, the gasket 216 has a cross-sectional profile having sides that are configured to engage the top surface 212 of the side portion, an inner sidewall 402 of the rib 214, and the cover 132.

In some embodiments, the inner sidewall 402 of the rib extends upward from the top surface 212, offset a distance from an inner wall 403 of the side portion selected to allow the gasket 216 to seat and form a hermetic seal between the cover 132 and the side portion 210. In other words, the inner sidewall 402 is offset from the inner wall 403 a distance x that is sufficient to allow the gasket 216 to properly form a hermetic seal. This distance may vary depending on the proximity of the disk 204 OD. Beneficially, the vertical inner sidewall 402, together with the horizontal top surface 212, support the gasket 216 and prevent the gasket 216 from buckling under pressure of the cover 132.

In certain embodiments, the gasket 216 may be adhered to the top surface 212 with an adhesive 404. The adhesive 404 may be a bead of adhesive positioned in a corner of an intersection, as depicted, between the vertical inner sidewall 402 and the top surface 212. Alternatively, the adhesive 404 may be a thin layer that coats one or both of the top surface 212 and a portion of the vertical inner sidewall 402. In areas of the top surface 212 that are not as narrow, and where the gasket 216 is not positioned adjacent the rib 214, the adhesive 404 is disposed only on the top surface 212 where the gasket 216 will be positioned. In other examples, the adhesive is only applied to regions of the top surface that correspond to the thick region 302 and is not applied to regions of the top surface that correspond to the thin region 304. In alternative embodiments, the gasket 216 is a formed-in-place gasket ("FIPG") that is disposed as a viscous liquid on the top surface 212 and then cured, by UV light for example, and does not require an additionally adhesive, as the FIPG gasket adheres itself to the top surface 212.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A magnetic storage device, comprising:
a housing having a base and a cover, where the base comprises a bottom portion and a plurality of side portions defining an interior cavity for maintaining a plurality of magnetic disks, where the plurality of side portions forms a top surface configured to receive the cover, and where a rib extends outward from the top surface; and
a continuous gasket disposed between the cover and the top surface, where the continuous gasket comprises at least:
a first region having a first cross-sectional profile having a width and a height, where the width of the first cross-sectional profile is greater than or equal to the height of the first cross-sectional profile; and
a second region having a second cross-sectional profile having a width and a height, where the width of the first region is greater than the width of the second region, where the width of the second cross-sectional profile is less than the height of the second cross-sectional profile.

2. The magnetic storage device according to claim 1, where the width of the first cross-sectional profile is greater than the height of the first cross-sectional profile.

3. The magnetic storage device according to claim 1, where a sidewall of the second cross-sectional profile engages a side portion of the rib.

4. The magnetic storage device according to claim 1, where the rib is configured to position the cover with respect to the base.

5. The magnetic storage device according to claim 4, where the rib forms a perimeter around the cover.

6. The magnetic storage device according to claim 5, where the rib comprises a first inner sidewall, where the first inner sidewall is offset from a second inner sidewall formed by the plurality of side portions, and where the top surface is disposed between the first inner sidewall and the second inner sidewall.

7. The magnetic storage device according to claim 6, where the second cross-sectional profile comprises a first side configured to engage the top surface and a second side configured to engage the first inner sidewall.

8. The magnetic storage device according to claim 7, where the continuous gasket includes a quantity of three regions having the second cross-sectional profile, each of the three regions being positioned adjacent one of three locations where an outside diameter of the plurality of magnetic disks comes nearest the side portions, and where each of the three regions is substantially linear.

9. The magnetic storage device according to claim 8, where an adhesive is disposed between the continuous gasket and the top surface.

10. The magnetic storage device according to claim 8, where the continuous gasket constitutes a self-adhering formed-in-place gasket.

* * * * *